No. 837,964. PATENTED DEC. 11, 1906.
N. B. ROSS & T. HORSTMAN.
VOTING MACHINE.
APPLICATION FILED JAN. 10, 1906.

Witnesses
C. W. Miles
A. McCormack

Inventors
Napoleon B. Ross
Theodore Horstman
By Walter F. Murray
Attorney

No. 837,964. PATENTED DEC. 11, 1906.
N. B. ROSS & T. HORSTMAN.
VOTING MACHINE.
APPLICATION FILED JAN. 10, 1906.

Witnesses
C. W. Miles
A. McCormack

Inventors
Napoleon B. Ross
Theodore Horstman
By Walter F. Murray
Attorney

No. 837,964. PATENTED DEC. 11, 1906.
N. B. ROSS & T. HORSTMAN.
VOTING MACHINE.
APPLICATION FILED JAN. 10, 1906.

UNITED STATES PATENT OFFICE.

NAPOLEON B. ROSS, OF AMELIA, AND THEODORE HORSTMAN, OF CINCINNATI, OHIO.

VOTING-MACHINE.

No. 837,964.                    Specification of Letters Patent.                    Patented Dec. 11, 1906.

Application filed January 10, 1906. Serial No. 295,328.

*To all whom it may concern:*

Be it known that we, NAPOLEON B. ROSS, a resident of Amelia, county of Clermont, and THEODORE HORSTMAN, a resident of Cincinnati, county of Hamilton, State of Ohio, citizens of the United States of America, have invented certain new and useful Improvements in Voting-Machines, of which the following is a specification.

The object of our invention is a voting-machine which may be used either to register a vote upon a record or for depositing a ballot and which is so arranged that only one of these actions may be taken at a time, in which the mechanism for registering votes upon one of a set of records is arranged so that only one vote upon one record may be registered at a time, in which the mechanism for receiving the ballots is arranged so that only a single ballot may be cast at a time; which has efficient means for preventing the manipulation of either the record or of the ballot mechanism by either the voter or officers of the election; which has a reliable means for locking the register, the ballot-box, and the operative parts after the polls have closed and for inclosing the parts for storage and shipment, and which has a ready means for setting up the machine for use again at another election.

The invention will be described first in connection with the accompanying drawings, in which like parts are indicated by similar reference-letters wherever they occur throughout the various views, and then will be pointed out specifically in the claims.

Referring to the drawings.

Figure 4:
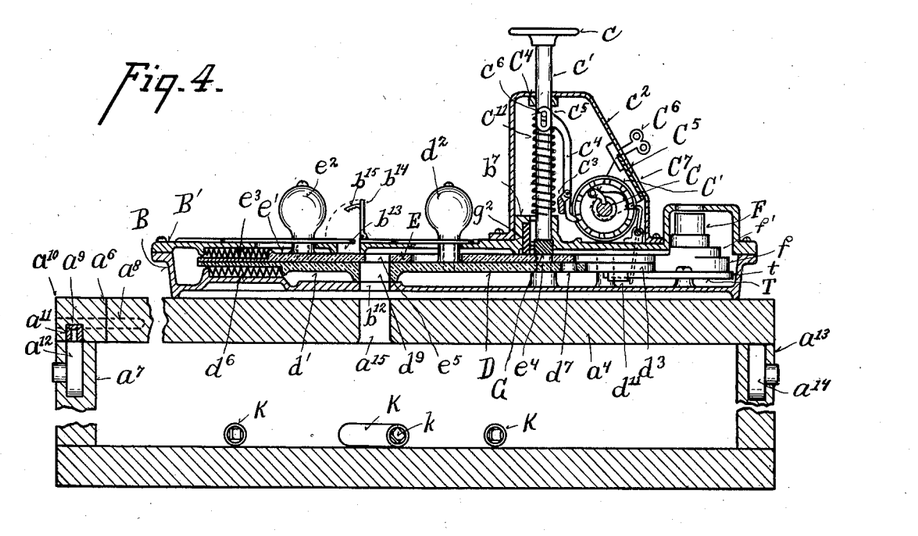
Fig. 4 is a transverse vertical sectional view of the operative mechanism in its normal position, the section of the operative parts being taken on line $x\ x$ of Fig. 6, the ballot-box being shown broken off and having its top and bottom brought closely together to economize space, a view of the ballot-holder being shown in elevation upon the bottom of the box.

Referring to the parts, ballot-box A has upon its ends a series of eyes $a$, which are to receive headed studs upon standards $a'$, which support the horizontal rods $a^2$, from which the curtains $a^3$ are hung to form the booth within which the voter stands. Cover $a^4$ of the ballot-box is centrally pivoted to the box A at points $a^5$, the cover being made narrower than the width of the box, so that its front edge $a^6$ in the normal position of the cover, such as shown in Fig. 4, stands within the front wall $a^7$ of the box, so that the cover may be rotated upon the pivots $a^5$ to carry the operative parts located upon the cover within the ballot-box. The front edge $a^6$ of the cover has a series of recesses $a^8$, (shown in dotted line, Fig. 4,) which receive studs $a^9$, projecting from a bar $a^{10}$, which is adapted to rest upon the wall $a^7$ of the box and has a lock-housing $a^{11}$ to receive the bolt of a lock $a^{12}$, located within the upper edge of the wall $a^7$. It is seen that when the bolt engages the lock-housing $a^{11}$ that the cover of the ballot-box is locked firmly thereon. When it is desired to have the operative parts located within the ballot-box—as, for instance, after the close of an election—the lock $a^{12}$ is opened, the bar $a^{10}$ removed, the cover $a^4$ is rotated around the pivots $a^5$ to the position shown in Fig. 3, and the rod $a^{10}$ is placed upon the rear wall $a^{13}$ of the ballot-box and locked in position by the lock $a^{14}$, similar to the lock $a^{12}$, located in the rear wall $a^{13}$ in a manner similar to the lock $a^{12}$.

The housing for the operative parts consists of a lower shell B and cover B', the shell B being secured to the cover of the ballot-box and the cover B' being screwed to the shell B.

We will describe first the mechanism for registering a vote upon one of the record-disks by pushing one of a set of keys.

Figures 6, 8, 9:
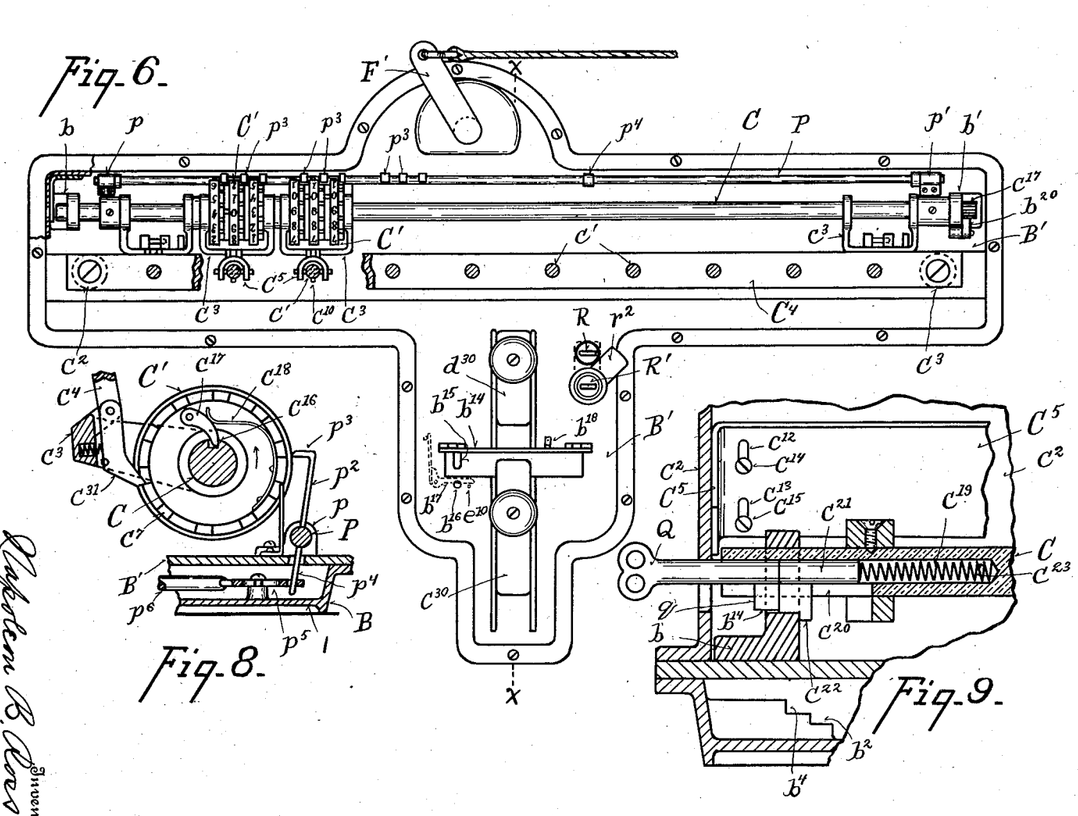
Fig. 6 is a plan view of the mechanism shown in Fig. 4, but with the housing for the recording-disks removed to expose the operative parts.
Fig. 8 is a sectional detail view of one of the recording-disks, the shaft upon which they are mounted, one of the actuating-pawls, and the locking mechanism.
Fig. 9 is a detail sectional view of the end of the shaft upon which the recording-disks are mounted, and the key for operating said shaft to carry the series of disks to their zero position, as is done when the machine is set up afresh for use.

Referring to Fig. 6, upon cover B' are secured two brackets $b$ $b'$, between which shaft C is journaled. Shaft C has mounted loosely upon it a number of sets of recording-disks C', the number depending upon the number of voting-keys $c$ which the machine has. Each set of recording-disks consists of three disks, one the unit, one the tens, and one the hundreds disk, the said units, tens, and hundreds disks being coupled together in any of the well-known manners for carrying the units to the tens after the units-disk has been moved through ten steps and the tens to the hundreds after the tens-disk has been moved through ten steps. Located opposite each set of recording-disks C' are vertical rods $c'$, which carry the keys $c$. Mounted upon the cover B' are two journal-rods C² and C³, which support a horizontal perforated rod C⁴, through which rods $c'$ project. A housing $c^2$ is secured upon the cover B' to house the recording-disks. Shaft C has journaled upon it brackets $c^3$, surrounding each series of disks C', to which a lever C⁴ is pivoted at its fulcrum-point, the opposite end of the lever being forked at $c^5$ and straddling the rod $c'$. The fork $c^5$ has an elongated hole into which projects a pin $c^6$, which projects out from the rod $c'$. The lower end of the lever $c^4$ is adapted to engage into one of a series of regularly-spaced notches $c^7$ upon the units-disks. When the rod $c'$ is depressed by pressing on the key $c$, the units-disk is moved forward through one step.

We shall now describe the means whereby but one of the rods $c'$ may be depressed at a single operation and whereby the ballot-holder depositor may not be actuated at the same time as the lever-recorder, and vice versa.

Figures 7, 10, 11, 12:
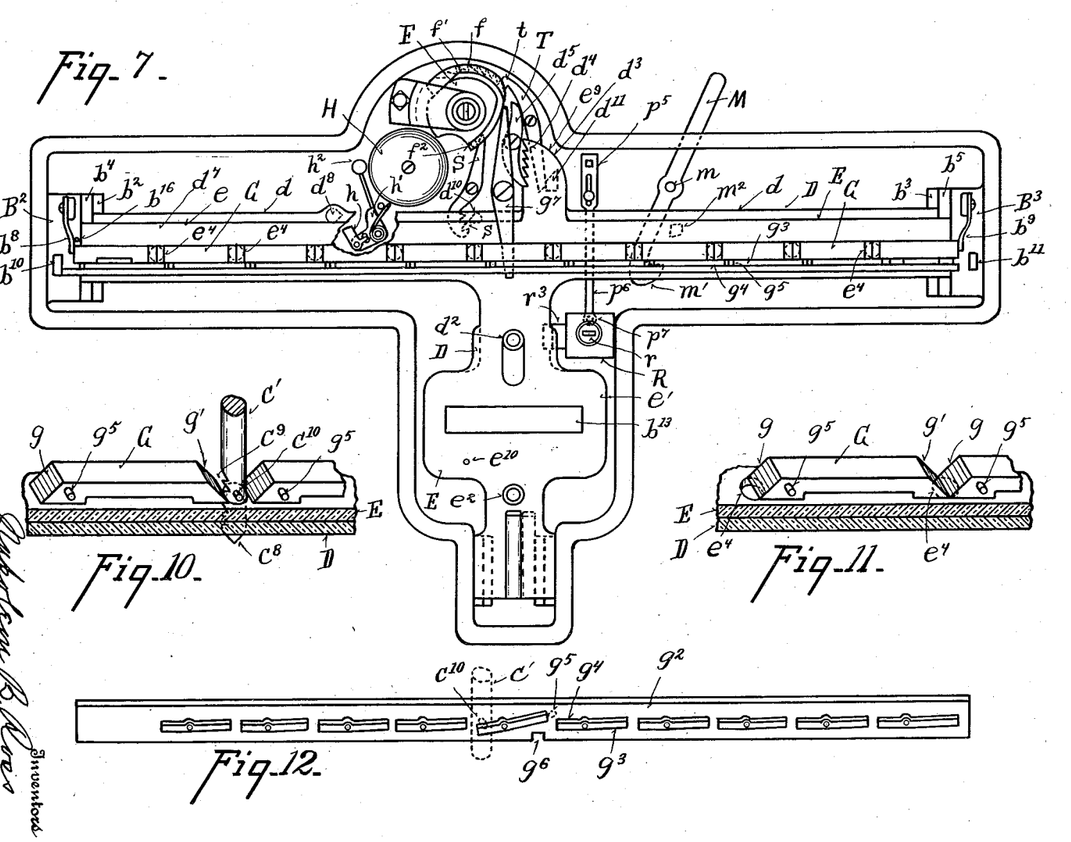
Fig. 7 is a view similar to Fig. 6, but with the recording-disks, their housing, and the cover for the operative parts removed.
Fig. 10 is a detail perspective view, partly in section, of the regulating-blocks, which are located below the rods of keys to prevent more than one key being actuated at a time.
Fig. 11 is a view similar to Fig. 10, but showing the regulating-blocks in their normal position.
Fig. 12 is a perspective view of the sliding bar for moving the regulating-blocks to release the key-rods.

Located within the housing formed by the shell B and cover B' are two horizontal T-shaped plates D and E, the plate E lying on top of the plate D, whose longitudinal arm $d$ slides upon ways $b^2$ and $b^3$, formed in blocks B² and B³, situated upon the bottom of shell B, as shown in Fig. 7. The transverse arm $d'$ of the plate D has attached to it a knob $d^2$, whose shank passes through a slot in the plate E and a slot in the cover B', as shown in Fig. 4. Plate D likewise has a transverse finger $d^3$, which is serrated along its edge $d^4$ to engage a pawl $d^5$, which is pivoted upon the bottom of the shell B, and is held normally in contact with the serrated edge $d^4$ by means of a spring.

Figure 5:
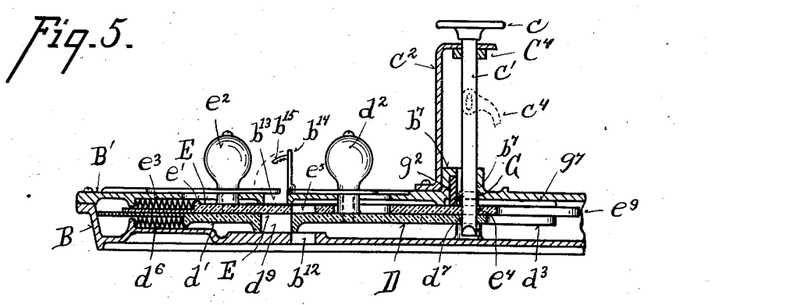
Fig. 5 is a detail view of the operative mechanism similar to Fig. 4, but with the disk recorders omitted and with the parts shown in the relative position they occupy when the voter has depressed the key-bar to register a vote upon the recorder.

The longitudinal arm $e$ of plate E slides upon ways $b^4$ and $b^5$ upon blocks B² and B³, has a transverse arm $e'$ above arm $d'$, which carries a knob $e^2$, the shank of which passes through a transverse slot in the cover B', as shown in Fig. 4. Plates D and E are held in their normal position by means of coiled springs $d^6$ and $e^3$, as shown in Fig. 4. In this normal position a series of longitudinal perforations $e^4$ in plate E stands immediately below the key-rods $c'$ of the keys $c$. The series of similar perforations $d^7$ in the plate D in this normal position stand in the rear of the perforations $e^4$, so that none of the rods $c'$ may be depressed. When the plate D is drawn forward by grasping the knob $d^2$ to the position shown in Fig. 5, the perforations $d^7$ register with the perforations $e^4$, and then any one of the rods $c'$ may be depressed by a pressure brought to bear on the key $c$. When the plate D is in its forward position, it is seen that it is locked by means of the pawl $d^5$, so that it may not be returned until the pawl $d^5$ is thrown out of engagement with the serrated edge $d^4$. The pawl $d^5$ may be disengaged from the serrated edge $d^4$ by the turning of the cam F, which is journaled upon a stud $b^6$, projecting up from the bottom of the shell B. The cam F is rotated by means of the crank-arm F' and has one of its faces $f$ to contact the pawl $d^5$.

Only one of the keys $c$ may be depressed at a time. This is accomplished by the following means: Located upon top of the longitudinal arm $e$ are a series of blocks G, which are of an equal length to the distance between the centers of the perforations $e^4$ in the plate E. Each of the ends $g$ $g'$ of the blocks G is beveled. The blocks G slide in a longitudinal guide-channel $b^7$, formed in the cover B'. In their normal position the ends of the blocks stand centrally over and cover the perforations $e^4$. They are held in this normal position by means of flat springs $b^8$ and $b^9$, secured to the bottom of the cover B. Adjacent to the ends of the series of blocks G stop-blocks $b^{10}$ and $b^{11}$ are fixed to the bottom of shell B, each at a distance from the ends of the blocks equal to one-half the diameter of the perforations $e^4$, so that when a rod $c'$ is depressed its lower pointed end $c^8$ will spread the blocks adjacent to its ends apart and cause the end blocks of the series to abut against the stop-blocks $b^{10}$ and $b^{11}$. It is seen, then, that the blocks are not capable of any further longitudinal movement as long as the key remains depressed, so that the blocks G will then prevent the depression of any other key of the series.

After the key $c$ has been depressed it remains depressed until after the cam F has been rotated by pulling upon the cam F'. This is accomplished by the following means: The spring $b^8$ is made stronger than the spring $b^9$, so that the former will cause the beveled edge $g'$ of the block G to engage the serrated edge $c^9$ of the rod $c'$, which has been depressed. Adjacent to the blocks G within the channel $b^7$ is a horizontal bar $g^2$, upon which are pivoted a series of levers $g^3$, each of whose short arm $g^4$ stands in the path of a pin $c^{10}$, which projects from each of the rods $c'$, and whose long arm stands normally adjacent to but below a pin $g^5$ near the end $g$ of each of the bars G. When a rod $c'$ is depressed, pin $c^{10}$ contacts the short arm $g^4$ and raises the long arm $g^3$, so that its end stands at the same level as the pin $g^5$ upon the adjacent block G. Bar $g^2$ has a notch $g^6$, which is engaged by a lever $g^7$, which is pivoted upon the bottom of the shell B and whose opposite end stands adjacent to the face $f''$ of the cam F. When the cam F is rotated by actuating the crank-arm F', the lever $g^7$ reciprocates the bar $g^2$, causes the long arm of the lever $g^3$, which has been contacted by the pin $c^{10}$ upon the rod $c'$, to contact the pin $g^5$, and to carry the block G out of contact with the serrated edge $c^9$ of the depressed bar is then carried upward to its normal position by the coiled spring $c^{11}$. After the rod $c'$ has been raised the springs $b^8$ and $b^9$ carry the blocks G to their normal position with their ends centrally over the perforations $e^4$.

Plate D carries a stud $d^8$, which strikes a bell-crank lever $h$, which is pivoted to the arm of a second bell-crank lever $h'$, which in turn is pivoted to the bottom of the shell B. One arm of the bell-crank lever $h'$ is slotted to be engaged by one arm of the bell-crank lever $h$, the other arm of the lever $h'$ carrying a hammer $h^2$ of a bell H. When the plate D is drawn forward, the stud $d^8$ contacts the arm $h$, rotates it to draw the hammer $h^2$ away from the bell H, and the stud $d^8$ releases the lever $h$ just as the perforations $d^7$ are made to register with the perforations $e^4$ and sounds the bell to indicate that the voter has placed the mechanism in position for one of the keys to be depressed. When the plate D is returning to its normal position, the slot in the arm of the lever $h'$ permits the lever $h$ to move upon its pivot to allow the stud $d^8$ to pass.

The purpose of causing the pin $c^6$, which engages the lever $c^4$ to work in the slot, is to prevent the lever $c^4$ being actuated until the end of the rod $c'$ has been depressed sufficiently to enter the perforation $d^7$ in the plate D, and thus have its serrated edge engaged by one of the blocks G.

We will now describe the ballot-holder depositor.

The ballot-holder consists of a cylindrical box K with a removable cover $k$ to enable the ballot to be placed in the box K. The cover of the ballot-box has a slot $a^{15}$, which registers with a slot $b^{12}$ in the shell B, which slot in the normal position of the plate D and E registers with slots $d^9$ and $e^5$ in the plates D and E. Cover B' has a longitudinal slot $b^{13}$, which in the normal position of the plates D and E stand in front of the slots $e^5$ and $b^{12}$. When the plates D and E are drawn forward by pulling upon the knob $e^2$, slots $e^5$ and $b^{12}$ are caused to register with the slots $b^{13}$. A ballot-holder may then be deposited in the receptacle formed by the slots $e^5$ and $b^{12}$ and will be carried forward to be deposited in the ballot-box through the slot $a^{15}$, when the plates D and E are carried forward to their normal position upon the actuation of the cam F.

Figures 1, 2, 3:
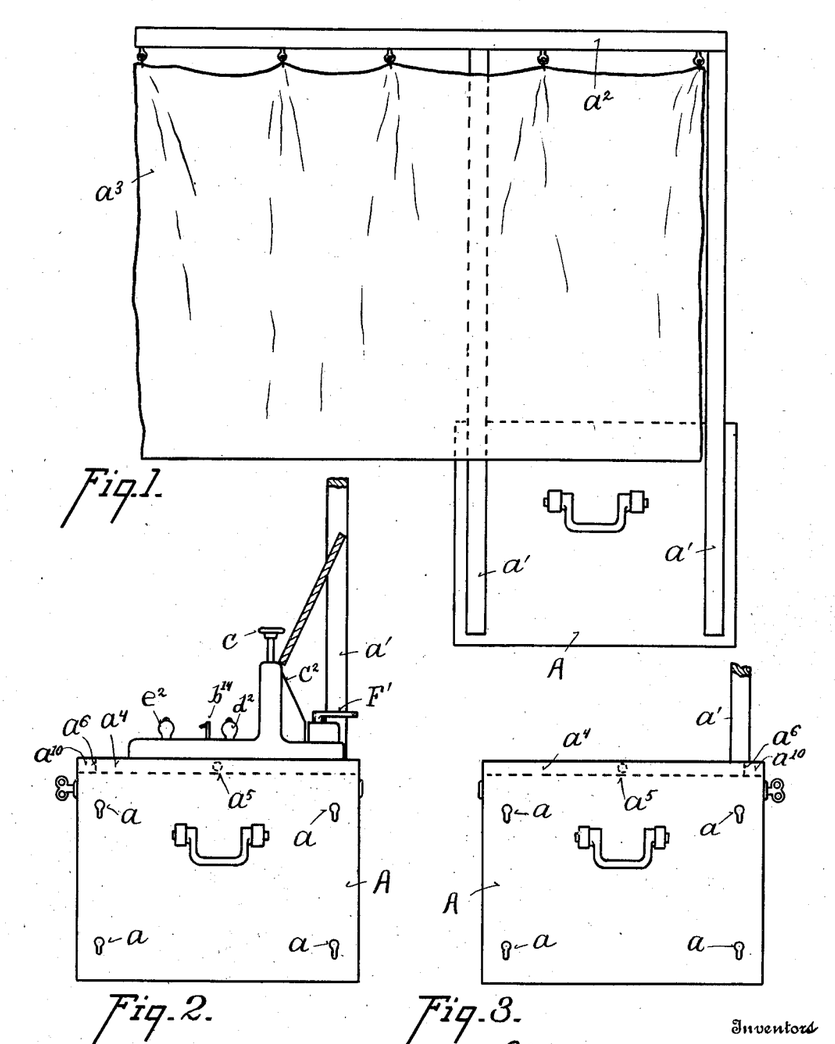
Figure 1 is a side elevation of a voting-machine, showing our invention with the booth ready to receive the voter.
Fig. 2 is a similar view of the same, but showing the rods which support the curtains removed from the ballot-box and showing the post-board in connection.
Fig. 3 is a view similar to Fig. 2, but showing the parts in the position they occupy after the recording mechanism has been housed within the ballot-box as it is at the close of an election.

When the plate E is in its forward position, as shown in Fig. 3, for receiving the ballot-holder, the imperforate part of the arm $e$ stands below the rods $c'$, so that they may not then be depressed.

Figure 13:
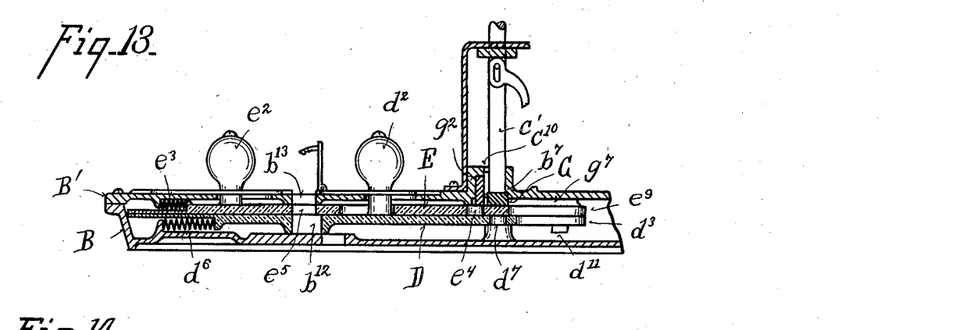
Fig. 13 is a view similar to Fig. 5, showing the operative parts in the position they occupy to receive a ballot-holder.

Plate E has a transverse finger $e^9$, similar to finger $d^3$ of plate D, and having an edge serrated similarly to edge $d^4$, and which in the normal position of the plates, such as shown in Fig. 7, has the teeth of the serrated part registering with the teeth of the serrated edge $d^5$ and engaged likewise by the pawl $d^5$, which therefore holds the plates D and E in their forward position after the voter has pulled it forward, as shown in Fig. 13, until the officer of election rotates the cam F to move the pawl $d^5$ and to permit the springs $e^3$ and $d^6$ to return them to their normal position, in which the slots $d^9$ and $e^5$ register with the slots $a^{15}$ in the cover of the ballot-box, when the ballot-holder K will drop into the ballot-box.

Figure 16:
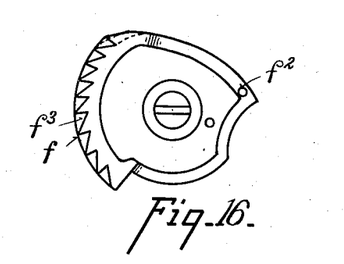
Fig. 16 is an inverted plan view of the cam shown in Fig. 15.

To prevent a ballot-holder being removed after a voter has placed it in the receptacle formed by the slots $e^5$ and $d^9$, a door $b^{14}$ is hinged to the cover B' upon one side of the slot $b^{13}$ therein. Door $b^{14}$ has a screw-threaded finger $b^{15}$ to enter a hole $b^{16}$ in the cover, as shown in Fig. 16, to be engaged by a lever $b^{17}$, pivoted upon the under side of the cover B'. Plate E carries a pin $e^{10}$, which in the rearward position of the plate E contacts the lever $b^{17}$ and holds it out of the path of the finger $b^{15}$ of the door $b^{14}$. After the voter has placed the ballot-holder in the receptacle formed by the slots $e^5$ and $d^9$ he closes the door $b^{14}$, which is then held closed by the lever $b^{17}$ engaging the finger $b^{15}$, and holds it closed until upon the rearward movement of the plate E the pin $e^{10}$ contacts the lever $b^{17}$, which then releases the finger $b^{15}$, and the spring $b^{18}$ upon the door $b^{15}$ raises it, as shown in Fig. 6.

Figure 17:
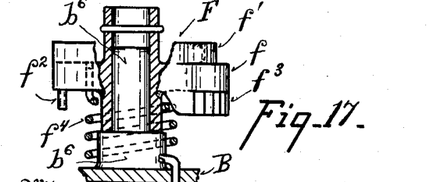
Fig. 17 is a view of the cam, partly in side elevation and partly in section.

We have provided a means for preventing the officer of election from assisting the voter in casting more than one vote, which consists of a lever S upon the bottom of the shell B, having one of its ends serrated at $s$ and having its opposite end standing adjacent to the cam F and being normally contacted by a downwardly-projecting pin $f^2$ upon the under side of the cam F. This pin in the normal position (such as shown in Fig. 7) holds the lever S in a position such that its serrated edge $s$ stands out of the path of a stud $d^{10}$, which projects downward from the under side of plate D, as shown in Fig. 7. Should the officer of election rotate the cam F in an attempt to unlock the plates D and E, so as to permit a voter to manipulate the same, this rotation carries the pin $f^2$ out of contact with the lever S, which is then carried by a spring into contact with the stud $e^{11}$, thus locking the plate against motion until the cam has been brought back to its normal position. We have provided means likewise whereby when the cam F has been started to rotate it may not be brought back to its normal position until the full rotation has been given to it, which releases all the pawls to bring all the parts back to their normal position. This is accomplished by means of a lever T, which is pivoted upon the bottom of shell B and has a hooked end $t$, which is held normally out of contact with teeth $f^3$ upon cam F by means of a stud $d^{11}$, which projects downward from finger $d^3$. As soon as the plate D is pulled forward the stud $d^{11}$ is carried out of contact with the lever T, and then its spring carries the hooked end $t$ into contact with the teeth $f^3$ upon the cam F. This tooth $t$, engaging the teeth $f^3$, allows a rotation of the cam F only in a right-hand direction, (looking at Fig. 7,) so that when the cam is started to rotate it cannot be returned to its normal position until the plate D upon its return to its normal position causes the stud $d^{11}$ to contact the lever T and carry the hook out of contact with the teeth $f^3$. This operation occurs just as the plate D is brought to its normal position. The cam F being then released from the hook $t$, the coiled spring $f^4$ (see Fig. 17) returns the cam to its normal position. (Shown in Fig. 7.) Lever T and pawls $d^5$ and S are held in their normal positions by coiled springs similar to the spring which holds cam F in its normal position, as shown in Fig. 17.

In Fig. 7 is shown an attachment for permitting the deposit of smaller ballot-holders, such as might be used by women voters, who would cast a limited ballot upon certain questions. This consists in a lever M, pivoted at $m$ on the bottom of the shell B and having a hook $m'$ at its end. Plate D has upon its lower side a stud $m^2$. Lever M normally stands, as shown in Fig. 7, with the hook $m'$ out of the path of the stud $m^2$ upon the bottom of the plate D, and when it is desired to allow a smaller ballot-holder to be deposited the lever M is reciprocated so as to bring the hook $m'$ into the path of the stud $m^2$, and thus to limit the forward movement of the plate D, and thereby limit the size of the receptacle formed by the slots $e^5$ and $d^9$.

Figure 14:
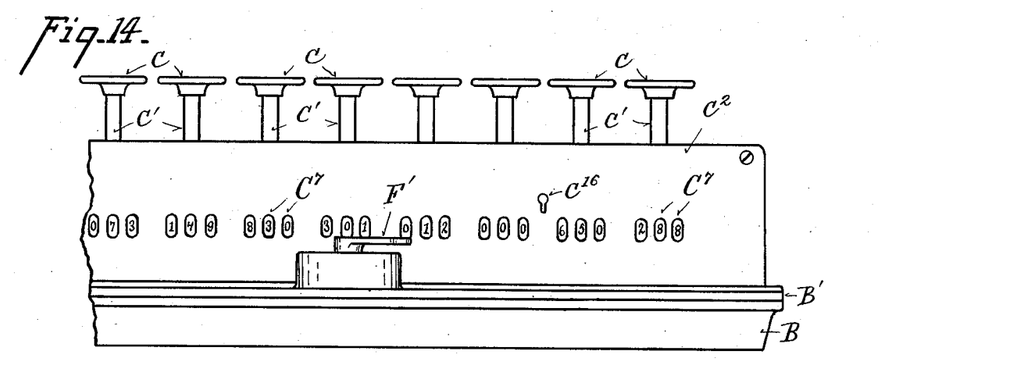
Fig. 14 is a rear view of the key-bars and of the housing for the recording-disks, showing the shutter raised to disclose the numbers of votes recorded upon each set of disks.
Figure 15:
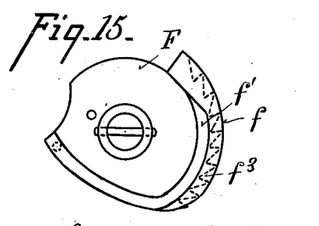
Fig. 15 is a detail plan view of the cam by the rotation of which an officer of election releases the parts from the position in which they have been left by a voter to allow them to resume the normal position.

When it is desired to see the number of votes registered upon the recording-disks, that end is attained in the following manner: Housing $c^2$ has a series of perforations $C^7$ to register with the recording-disks. These perforations normally are closed by means of a shutter $C^5$, which is mounted upon the inner side of housing $c^2$ by means of slots $c^{12}$ and $c^{13}$, which engage headed screws $c^{14}$ and $c^{15}$ at each end of the shutter and permit a reciprocation of the same. The shutter is reciprocated by means of a key $C^6$, which may be inserted through a keyhole $c^{16}$ in housing $c^2$ (shown in Fig. 14) to engage a hole cut in the shutter $C^5$, so that the rotation of the key $C^6$ will raise the shutter $C^5$ and uncover openings $C^7$ to permit of an inspection of the recording-disks.

All of the record-disks may be locked in position by the turning of a key. This is accomplished thus: A shaft P is journaled in brackets $p$ and $p'$, secured upon the cover B', as shown in Fig. 6. Shaft P carries a series of arms $p^2$, having hooked ends $p^3$, which stand normally adjacent to each of the recording-disks. Shaft P has likewise a downwardly-projecting arm $p^4$, which is engaged by a slotted arm $p^5$, which is mounted to slide upon a stud upon the bottom of shell B and is engaged by a link $p^6$, as shown in Figs. 7 and 8. Link $p^6$ is pivoted at $p^7$ to the rotating shaft $r$ of lock R, mounted upon the bottom of the shell B. When the shaft $r$ is rotated by its key, the link $p^6$ is thrown rearward, rotates the shaft P, and causes the hooks $p^3$ to enter the adjacent notches $c^7$ upon each of the recording-disks, and thus locks them securely against further rotation.

In order to afford an extra precaution against the possibility of tampering with the machine, we have provided an additional lock R' for covering the lock R. Lock R' has a leaf $r^2$ to be projected over the lock R and to be locked there by a key of a different character from the key which unlocks the lock R. It is the intention that the keys to locks R and R' shall be placed in the possession of different officers of election.

Figures 18, 19, 20:
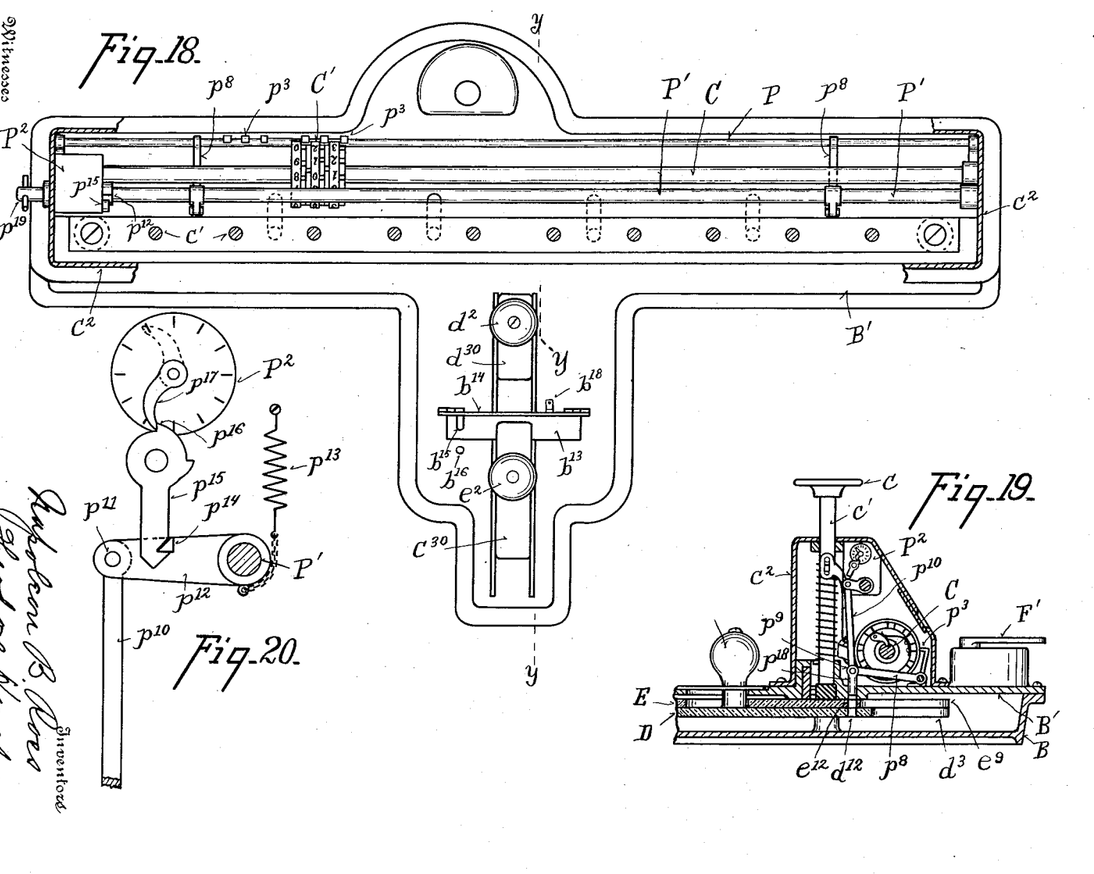
Fig. 18 is a view similar to Fig. 6, but showing a modification.
Fig. 19 is a sectional view taken upon line $y\ y$ of Fig. 18, but with the housing for the recording-disks in position.
Fig. 20 is a detail view of the parts shown in Fig. 19, but upon an enlarged scale.

In Figs. 18, 19, and 20 we have illustrated an automatic means for locking the recording-disks at a predetermined time by means of a time-lock. In this modification in place of the link $p^6$ and the arm $p^4$ for rotating the shaft P to carry the hooks $p^3$ into contact with the recording-disks we have substituted a link $p^8$, which is pivoted at $p^9$ to a link $p^{10}$, which is pivoted at $p^{11}$ to the link $p^{12}$, secured to the shaft P', which is journaled in the ends of the housing $c^2$. Link $p^{12}$ is contacted by a spring $p^{13}$, which normally presses it downward. Link $p^{12}$ has a stud $p^{14}$, which stands in the path of a pawl $p^{15}$, pivoted upon the end of housing $c^2$. Pawl $p^{15}$ has a tooth $p^{16}$, which stands in the path of the hand $p^{17}$ of a clock $P^2$. The link $p^8$ carries a bolt $p^{18}$, (shown in Fig. 19,) which passes through a perforation in the cover B' in alinement with perforations $e^{12}$ and $d^{12}$ in plates D and E when in their normal position. When it is desired to place the machine in position for use, shaft P' is rotated, by means of handle $p^{19}$, to carry bolt $p^{18}$ up out of perforations $e^{12}$ and $d^{12}$ until the stud $p^{14}$ is engaged by the pawl $p^{15}$. It is seen then that in this position the hooks $p^3$ are carried out of contact with the recording-disks and the machine is in condition for use. The hand $p^{17}$ of the clock is set so that at a predetermined time it will strike the tooth $p^{16}$ of the pawl $p^{15}$, carry the pawl out of contact with the stud $p^{14}$, and allow the spring $p^{13}$ to throw the link $p^{10}$ downward, thereby causing the bolt $p^{18}$ to enter the plates D and E and the hooks $p^3$ to lock the recording-disks.

We will now describe the means whereby the disks may be carried to the zero position when it is desired to set the machine up for use.

Shaft C has a longitudinal radial groove $c^{16}$, as shown in Fig. 8, and each of the recording-disks carries a pawl $c^{17}$, which is pressed against the shaft C by means of a leaf-spring $c^{18}$. It is seen that when the pawl $c^{17}$ engages the groove $c^{16}$ the disk is locked to the shaft C against an independent right-handed rotation, as shown in Fig. 8, so that a rotation of the shaft C in a left-handed direction would carry the recording-disks with it when the pawl $c^{16}$ engages the groove $c^{17}$, (looking at Fig. 8.) The left end of the shaft C has a central bore $c^{19}$ and a radial slot $c^{20}$ extending into the bore $c^{19}$ for a part of its way. Bracket b has also a groove $b^{14}$, which in the normal position of the shaft C—viz., the position that the shaft occupies when the machine is set up for use—registers with the groove $c^{20}$. Located in bore $c^{19}$ is a key $c^{21}$, having a finger $c^{22}$ fitting the groove $c^{20}$ and normally held against the bracket b by a coiled spring $c^{23}$, located in the bore $c^{19}$. The key Q is provided with a shank of the size of the bore $c^{19}$ and a finger $q$ to fit the radial groove $c^{20}$. When it is desired to bring the recording-disks all to the zero position, key Q is inserted into the bore $c^{19}$ and pressed inward past the bracket b against the pressure of the spring $c^{23}$. The shaft C is then rotated in a right-hand direction. The pawls $c^{17}$ of the various recording-disks will be standing at various positions, according to the number which is exhibited at the opening $C^7$ in the housing. When the groove $c^{16}$ in the rotation of the shaft C meets any one of the pawls, the pawl drops into the groove, and the further rotation of the shaft C carries that disk around with it. The pawls upon each disk are so placed that when the shaft C has been brought to its normal position—viz., the one in which the groove $c^{20}$ in the shaft registers with the groove $b^{14}$ in the bracket and the pawl stands in the groove $c^{16}$—the periphery of the disks stands in a position such that it presents the zero-mark at the opening $C^7$. When the key Q has carried the shaft C around one full rotation, the spring $c^{23}$ presses the key Q outward, so that it may be removed through the groove $b^{14}$ in the standard. To prevent the key Q being given a partial rotation and then being turned backward to the normal position, we have provided the shaft C with a pawl $b^{20}$, which is pivoted upon the bracket b' to engage teeth $c^{17}$ upon the shaft C, as shown upon the right-hand end of shaft C in Fig. 6.

We will now give an additional description of the use to which the machine may be put for voting purposes.

Supposing that the device has been taken from the storehouse in the form shown in Fig. 3. The officer of election secures the standards $a'$ and the rod $a^2$ and curtains $a^3$ in position. Then he unlocks the lock $a^{14}$, removes the rod $a^6$, rotates the cover of the ballot-box about the pivot $a^5$ to bring the operative parts into the position shown in Fig. 2. Then he places the bar $a^6$ upon the front of the cover and locks it in position by means of a lock $a^{12}$. He then raises the shutter $C^5$ by inserting the key through keyhole $c^{16}$ to open the perforations in the housing $c^2$ opposite the left-hand end of shaft C to permit the insertion of the key Q into the end of the shaft C. Then he rotates the shaft C, as heretofore described, to bring the recording-disks all to their zero position. He then removes the key Q, sets the shutter $C^5$ back to the position covering the openings $C^7$ and the key-opening for the key Q. The machine is now in condition for voting. Now, supposing that each of the keys $c$ stands for a straight party vote—that is, that its depression registers one vote for each name contained upon the ballot of some one political party. A voter, then, who wishes to vote a straight ticket first pulls forward the plate D by pulling forward on the knob $d^2$, which brings the perforations $d^7$ into alinement with the perforations $e^4$. The voter then presses down the key which stands for the party for which he desires to register his vote. The depression of the key throws the unit-disk of the recorder through one step. When the knob $d^2$ has been pulled to a position such as to render the depression of the key $c$ possible, the bell H is rung by the stud $d^8$, contacting the lever of the bell. Then the voter leaves the booth, and the officer of election rotates the crank F' by pulling upon the rope attached thereto. This causes the cam F to throw the lever $d^5$ out of contact with the serrated edge of the finger $d^3$, and the coiled spring $d^6$ then carries the plate D back to its normal position. The means whereby the voter is prevented from depressing more than one key—viz., regulating-blocks G, situated below each of the key-bars—has been described heretofore, so that additional description is thought to be unnecessary here; but it is seen that should a voter attempt to hold the plate D back when the officer of election has operated the cam F to allow the key-bar $c'$ to resume its normal position to again depress the bar is rendered impossible by reason of the spring $b^9$, carrying the block G, which is located upon the right of the key-bar $c'$ clear over the perforations $e^4$, so that a further depression of the key-bar $c'$ is not possible. The parts hold this abnormal position—viz., with the bar G thrown clear across the perforations $e^4$—until the cam F has resumed its normal position, thereby causing the lever $g^7$ to resume its normal position and to carry the bar $g^2$ back to its normal position, thereby releasing the bar G upon the left of the key-bar, which has just been depressed, from contact with the lever $g^3$, which is pivoted upon the bar $g^2$ adjacent to said key-bar. After the bar $g^2$ has resumed its normal position the stronger spring $b^8$ carries the blocks G back to their normal position with their ends centrally over the perforations $e^4$, the movement of the spring $b^8$ being limited by means of a pin $b^{10}$, located upon the bottom of the shell B, as seen upon the left-hand side of Fig. 7.

Should the voter who desired to vote a straight ticket have failed to depress the key-bar a sufficient amount to register his vote, the pin $e^{10}$ would not fully contact the lever $g^3$ and the lever $g^3$ would not have been turned up so as to contact the pin $g^5$. Therefore when the officer of election rotated the cam F the bar G, upon the left of the key-bar, would not have been thrown out of contact with the key-bar, so that it would remain depressed. As long as it remained depressed the plate D could not resume its normal position, because it would be held with its depression $d^7$ registering with the perforations $e^4$. As long as the plate D remains out of its normal position the stud $d^{11}$ does not contact with the ratchet-lever T, which would therefore hold the cam F in an abnormal position, so that before the officer of election could get the cam F back into a normal position it would be necessary for him to require the voter to return and fully depress the lever which he had left partially depressed, so that a voter could not thus lose his vote by a partial depression of the key-bar. Suppose that the next voter was one, for instance, who did not desire to vote by the recording of his vote on a disk, as he would in case he did not desire to vote a straight ticket, but that he desired to cast a ballot. The ballot then marked in the manner he might desire would be placed in a ballot-holder, then the voter by grasping the end $e^2$ and drawing it forward would cause slots $e^5$ and $b^{12}$ in the plates D and E to register with the slots $b^{13}$ in the cover B'. He would then place his ballot-holder containing his ballot in the receptacle formed by said slots $e^5$ and $b^{12}$ and would close the cover $b^{14}$, which could not then be opened again until the mechanism has resumed its normal position. The cover $b^{14}$ would then be automatically opened by the pin $e^{10}$ striking the lever $b^{17}$. Just as the parts resume their normal position it is seen that the receptacle containing the ballot-holder has registered with the slot $a^{15}$ in the cover of the ballot-box, and the ballot-holder has therefore been deposited into the ballot-box. When the knob $e^2$ has been drawn to its forward position to cause the slots $e^5$ and $b^{12}$ to register with the slot $b^{13}$ in the cover, the stud $d^8$ has operated the hammer of the bell to indicate this fact.

It is seen that a voter cannot cast a ballot and at the same time operate the key-bar, for when the parts are in a position to receive a ballot-holder, as shown in Fig. 13, the perforations $e^4$ in the plate E stand in front of the key-bars $c'$, so that the imperforate part of the plate E stands below the key-bars and prevents their depression. Should a voter attempt, with the connivance of the officer of election, who is controlling the operation of the cam F, to manipulate the knob E so as to draw the plate back after the ballot has been deposited, so as to deposit a second ballot, it is seen that this is prevented by the lever S, which contacts the stud $d^{10}$ and locks the plates D and E against backward movement as long as the cam F is held out of its normal position by the officer.

Should the election be one in which questions arise upon which there are voters who are restricted by law to a limited franchise, a special ballot-holder of smaller size than the regular ballot-holder is provided, as has heretofore been described, for holding the ballots of voters so limited. When such a voter enters the booth, the officer of election throws the lever M so that it stands in the path of the stud $m^2$ upon the plate D and limits the forward movement of the plates D and E, so that only a limited slot is presented in the opening $b^{13}$ to receive the reduced ballot-holder.

It is seen that the lever $d^5$ locks the plates D and E in this forward movement until released by the cam F, when the rearward movement of the plates D and E thus released will deposit the limited ballot-holders in the same manner as heretofore described. Should a regular ticket be placed within the holder for the limited ballot, this fact would at once be apparent to the officer of election as soon as the ballot-holder was opened, and the ballot could then be thrown out.

After the polls are closed one officer of election opens the lock $R'$ by the key in his possession. This exposes the lock R, and another officer of election, who has the key for that lock in his possession, rotates the lock R to throw the lever $p^6$, which actuates the hooked arms $p^3$ and carries them into engagement with each recording-disk and locks it securely in place. The throwing of the lock R likewise actuates a bolt $r^3$, which enters a slot in the side of plates D and E, as shown in dotted line, Fig. 7, and locks the parts against further movement. After the lock R has been actuated to lock the plates and the recording-disks in position the lock R is again brought into position to cover the lock R and locked. The officer of election then exposes the recording-disks at the opening $C^7$ by moving the shutter $C^5$ by means of the key $C^6$. The clerks of election then take off the total vote shown as cast upon each set of the recording-disks, after which the shutter is again locked in position. Then the ballot-box is opened by removing the rod $a^9$ from the wall $a^{13}$, and the ballot-holders are removed and the ballots counted. The ballots having been counted, each ballot is put back into the ballot-holder K or in case of a limited ballot back into the limited-ballot holder, and all of the ballot-holders are then placed back again in the ballot-box. The cover of the ballot-box is then rotated about its pivot $a^5$ to the position shown in Fig. 3, and the bar $a^6$ is placed in position, as shown in Fig. 4, and locked by means of the lock $a^{12}$. It is seen then that the record both of the straight votes and of the votes cast by ballot is kept intact for future reference in case of a contest or recount.

The standards and curtains having been then removed, the box and the booth are ready for storage for future use.

It is one of our objects to have this voting-machine useful for voting purposes at primary elections, in which cases the lever-recorders would not be used; but the ballot-depositors would be used in the manner before described, the ballot-holders then being used to receive the ballot containing the names of the party candidates for whom the voter wishes to vote.

While we have described our invention in its use for registering votes, we do not wish to be limited to voting-machines, as it may be used for other registration.

What we claim is—

1. In a voting-machine the combination of a series of recording-disks, a series of key-bars, means for coupling the recording-disks and the key-bars, automatic means for locking a key-bar in a position to which the voter pushes it to register a vote, a means whereby an officer of election may release the key-bar, a ballot-holder depositor, means for bringing the depositor into position to receive the ballot-holder, and a means actuated by the ballot-holder depositor to lock the key-bars against motion when the ballot-holder depositor is brought into position to receive a ballot-holder.

2. In a voting-machine the combination of a series of recording-disks, a series of key-bars, means for coupling the key-bars and recording-disks, two sliding reciprocating plates located beneath the key-bars, both plates having a row of perforations to pass the key-bars, means for holding the perforations in the plates when in their normal position out of register with each other, means for bringing one of said plates into a position with its perforations registering with that of the other plate to pass the key-bars, the plates having slots forming a receptacle for the ballot-holder situated so that when the slots register with each other the perforations in the plates are out of register with each other, and means for bringing the plates to a position to receive a ballot-holder in their registering slots.

3. In a voting-machine the combination of a series of recording-disks, a series of key-bars, means for coupling the key-bars and recording-disks, two sliding reciprocating plates located beneath the key-bars, both plates having a row of perforations to pass the key-bars, means for holding the perforations in the plates when in their normal position out of register with each other, means for bringing one of said plates into a position with its perforations registering with that of the other plate to pass the key-bars, the plates having slots forming a receptacle for a ballot-holder situated so that when the slots register with each other the perforations in the plates are out of register with each other, fingers projecting from each of the plates having serrated edges in alinement with each other, a pawl for engaging the serrated edges of both plates for holding either or both of the plates in any of their positions, and a cam to be operated by the officer of election for releasing the pawl from the fingers.

4. In a voting-machine the combination of a series of recording-disks, a series of key-bars, means for coupling the key-bars and recording-disks, two sliding reciprocating plates located beneath the key-bars, both plates having a row of perforations to pass the key-bars, means for holding the perforations in the plates when in their normal position out of register with each other, means for bringing one of said plates into a position with its perforations registering with that of the other plate to pass the key-bars, the plates having slots forming a receptacle for the ballot-holder situated so that when the slots register with each other the perforations in the plates are out of register with each other, fingers projecting from each of the plates having serrated edges in alinement with each other, a pawl for engaging the serrated edges of both plates, for holding the plates in any of their positions, a pawl for engaging the cam to prevent its return movement when rotated by the officer, and a stud carried by one of the plates for disengaging the pawl from the cam when the plates resume their normal position.

5. In a voting-machine the combination of a series of recording-disks, a series of key-bars, means for coupling the recording-disks and the key-bars, automatic means for locking a key-bar in a position to which the voter pushes it to register a vote, a ballot-holder depositor, means for bringing the depositor into position to receive the ballot-holder, a means actuated by the ballot-holder depositor to lock the key-bars against motion when the ballot-holder depositor is brought to receive the ballot-holder, means for bringing the depositor to its normal position, and a means to be actuated by the officer to allow either the key-bars or the ballot-holder depositors to be brought to their normal position.

6. In a voting-machine the combination of a slide, means for registering a vote when the slide is drawn from its normal position, an automatic lock to hold the slide when drawn from its normal position, a releasing mechanism to be actuated by an officer for unlocking the automatic lock for engaging the releasing mechanism to prevent its return when drawn from its normal position, and a means carried by the slide for releasing the second automatic lock when the slide reaches its normal position.

7. In a voting-machine the combination of a series of recording-disks, a series of key-bars, means for coupling the key-bars to the recording-disks, a sliding plate with perforations, means for moving the sliding plate to cause the perforations to stand in alinement with the key-bars, and means actuated by the depression of a key-bar for covering the remaining perforations while said key-bar remains depressed.

8. In a voting-machine the combination of a series of recording-disks, a series of key-bars, means for coupling the key-bars to the recording-disks, a sliding plate with perforations, means for moving the sliding plate, to cause the perforations to stand in alinement with the key-bars, a series of blocks beneath the key-bars with their ends standing normally centrally beneath the key-bars and adapted to be parted beneath one key-bar by the depression thereof, stops located at the ends of the series of blocks to limit their movement so as to allow the passage of but one key-bar at a time between them, an automatic means for locking the plate in the position with the perforations in alinement with the key-bars, and a means to be actuated by the officer of election for returning the plate to its normal position and for returning the key-bars and the regulating-blocks to their normal positions.

9. In a voting-machine the combination of a series of recording-disks, a series of key-bars, means for coupling the key-bars and recording-disks, two sliding reciprocating plates located beneath the key-bars, both plates having a row of perforations to pass the key-bars, means for holding the perforations in the plates when in their normal position out of register with each other, means for bringing one of said plates into position with its perforations registering with that of the other plate to pass the key-bars, the plates having slots forming a receptacle for a ballot-holder situated so that when the slots register with each other the perforations in the plates are out of register with each other, fingers projecting from each of the plates having serrated edges in alinement with each other, a pawl for engaging the serrated edges of both plates for holding either or both of the plates in any of their positions, a lever having teeth at one end and contacting the cam at its other end so that in its normal position the cam holds the teeth out of engagement with the plates, and a spring for carrying the lever into engagement with the plates when the cam is moved from its normal position, to lock the plates against movement until the cam has been brought again to its normal position.

10. In a voting-machine the combination of a ballot-box having a rotating cover, operative mechanism for registering votes secured to one side of the cover, means carried by the cover for depositing ballots within the box, means for locking the cover with the operative mechanism upon the outside of the ballot-box for the use of voters, or for locking the cover with the operative mechanism upon the interior of the box for the preservation of the record both of the registered votes and of the ballots deposited.

11. In a voting-machine the combination of a ballot-box, the cover pivoted to the top of the ballot-box having one of its edges adapted to be swung down within the ballot-box to permit the rotation of the cover through one hundred and eighty degrees thereof, a reversible locking-bar adapted to engage the edge of the cover either front or rear to lock it, a means of depositing ballots carried by the cover and the vote-recording mechanism mounted upon the cover and adapted to be swung down within the ballot-box.

12. In a voting-machine the combination of a shaft having a series of recording-disks mounted revolubly thereon, a series of key-bars, means of coupling the key-bars to the recording-disks, means to be actuated by the voter to permit the depression of one of the key-bars at a time to rotate the corresponding disk to register a vote, automatic means for locking the key-bar when depressed, a means actuated by the officer of election to release the key-bar, locking-levers adapted to engage the revolving disks, and a means for throwing the locking-levers into engagement with the disks to lock them on their shafts.

13. In a voting-machine the combination of a shaft having a series of recording-disks mounted revolubly thereon, a series of key-bars, means for coupling the key-bars to the recording-disks, means to be actuated by the voter to permit the depression of one of the key-bars at a time to rotate the corresponding disk to register a vote, automatic means for locking the key-bar when depressed, a means actuated by the officer of election to release the key-bar, a second revoluble shaft situated adjacent to the revolving disks, a series of arms carried by the second shaft to engage the recording-disks to lock them against movement, an arm secured to the second revoluble shaft and means for actuating said arm to throw the locking-arms into engagement with the revolving disks.

14. In a voting-machine the combination of a series of recording-disks, a series of key-bars, means for coupling the key-bars and recording-disks, two sliding reciprocating plates located beneath the key-bars, both plates having a row of perforations to pass the key-bars, means for holding the perforations in the plates when in their normal position out of register with each other, means for bringing one of said plates into a position with perforations registering with that of the other plate to pass the key-bars, the plates having slots forming a receptacle for the ballot-holder situated so that when the slots register with each other the perforations in the plates are out of register with each other, means for regulating the position of the plates so as to limit the size of the receptacle for receiving various-sized ballot-holders in the registering slots.

15. In a voting-machine the combination of a series of recording-disks, a series of key-bars, means for coupling the key-bars and the recording-disks, two sliding plates located beneath the key-bars, the upper of said plates having a series of perforations standing normally beneath the key-bars, the lower of said plates having a series of perforations standing normally in transverse alinement with the aforesaid perforations, but in the rear thereof, the plates each having a longitudinal slot which in the normal position of the plates register with each other, a housing inclosing the plates, and having a longitudinal slot standing normally out of register with the longitudinal slots in the plates, a ballot-holder upon the cover of which the housing is located and having a ballot-holder slot in its cover normally registering with the slots in the plates when in their normal position, regulating-blocks located upon the upper of said plates and standing normally centrally over the perforations in said upper plate, stops located at the ends of the regulating-blocks to pass one of the key-bars between them, a sliding longitudinal bar adjacent to the regulating-blocks, a series of levers carried by the sliding bar adapted to engage the regulating-blocks when depressed, a pin carried by each key-bar to cause the lever on the sliding bar to engage the adjacent block when the lever is depressed, a means for causing the edge of the block to engage a key-bar when depressed, a pivot-bar, a lever engaging the sliding bar, a lever engaging the sliding plates to lock them when drawn forward, and a cam to be actuated by the officer of election to engage the two levers and bring the parts to their normal position.

16. In a voting-machine the combination of a ballot-box, a cover having studs at its sides journaled in the box, the cover carrying voting mechanism and being of a width such that in the operative position of the voting-machine the front edge stands within the front edge of the box, a bar to rest upon the front edge of the box when the voting-machine is in its operative position and adapted to engage the front edge of the cover and to rest upon the rear edge of the box when the operative mechanism is within the ballot-box and to engage the edge of the cover, a lock-housing carried by the bar and catches for the lock located upon the front and rear of the ballot-box whereby the cover may be swung to carry the operative mechanism to the exterior or to the interior of the box, and be locked in either position.

17. In a voting-machine the combination of a series of recording-disks, a series of key-bars, means for coupling the key-bars and the recording-disks, two sliding plates located beneath the key-bars, the upper of said plates having a series of perforations standing normally beneath the key-bars, the lower of said plates having a series of perforations standing normally in transverse alinement with the aforesaid perforations but in the rear thereof, the plates each having a longitudinal slot which in the normal position of the plates register with each other, a housing inclosing the plates, and having a longitudinal slot standing normally out of register with the longitudinal slot in the plates, a ballot-box upon the cover of which the housing is located and having a ballot-holder slot in its cover normally registering with the slots in the plates when in their normal position, regulating-blocks located upon the upper of said plates and standing normally centrally over the perforations in said upper plate, stops located at the ends of the regulating-blocks to pass one of the key-bars between them, a sliding longitudinal bar adjacent to the regulating-blocks, a series of levers carried by the sliding bar adapted to engage the regulating-blocks when depressed, a pin carried by each key-bar to cause the lever on the sliding bar to engage the adjacent block when the lever is depressed, a means for causing the edge of the block to engage a key-bar when depressed, a pivot-bar, a lever engaging the sliding plates to lock them when drawn forward, a cam to be actuated by the officer of election to engage the two levers and bring the parts to their normal position, teeth upon the cam, a lever having a hooked end to engage the teeth upon the cam, and a block upon the lower of the sliding plates to engage the end of the hooked lever to hold its hook out of engagement with the cam when the plate is in its normal position.

NAPOLEON B. ROSS.
    THEODORE HORSTMAN.

Attest:
    ADELAIDE AMENT,
    WALTER F. MURRAY.